United States Patent [19]

Accetta et al.

[11] Patent Number: 4,592,063

[45] Date of Patent: May 27, 1986

[54] PULSED GAS LASERS HAVING FLEXIBLE EXIT GAS LINES

[75] Inventors: Joseph S. Accetta; Louis Galan, both of Ann Arbor; Patrick D. Hamilton, Northville; James L. Amick, Ann Arbor, all of Mich.

[73] Assignee: Photon Sources, Inc., Livonia, Mich.

[21] Appl. No.: 644,828

[22] Filed: Aug. 27, 1984

[51] Int. Cl.[4] .............................................. H01S 3/22
[52] U.S. Cl. ...................................... 372/58; 372/33; 372/55; 315/39
[58] Field of Search ...................... 372/58, 55, 33, 34, 372/89, 90; 378/61, 98; 137/114; 315/39

[56] References Cited

U.S. PATENT DOCUMENTS 4,538,635 9/1985 Laderman et al. ................... 372/58

Primary Examiner—Léon Scott, Jr.
Attorney, Agent, or Firm—Stephenson & Boller

[57] ABSTRACT

In a pulsed gas laser having a flexible exit gas line, such as polymer tubing, a device is disposed just upstream of the flexible tubing to attenuate certain characteristics of the exit gas before it reaches the flexible line. The device comprises a walled chamber having an inlet and an outlet and constructed and arranged to attenuate the peak pressure waves at the pulse frequency. The device also provides attenuation of temperature and for this purpose is made of a good thermal conductor such as copper. The invention enhances the effectiveness of the flexible polymer tubing exit gas lines and permits a laser to be pulsed at higher pulse frequencies than are conventionally done.

13 Claims, 5 Drawing Figures

PULSED GAS LASERS HAVING FLEXIBLE EXIT GAS LINES

BACKGROUND AND SUMMARY OF THE INVENTION

This invention relates generally to pulsed gas lasers and more particularly it relates to lasers of this type which utilize flexible exit gas lines, such as polymer tubing.

In a pulsed gas discharge laser, an active gas is passed through a laser cavity and is subjected to a pulsed electric field for exciting the gas molecules. This operation gives rise to pressure and temperature waves in the laser medium.

In a laser of this type it is conventional to use a vacuum pump to draw the gaseous medium from the cavity through an exit gas line. For certain laser installations, it is important for the exit gas lines to be flexible and narrow; for example, a polymer tube is a suitable line.

The present invention arises through the observation that certain enhancements to a pulsed gas laser which utilizes one or more flexible tubes for the exit gas line, or lines, can be made to improve upon the effectiveness of the flexible tube, or tubes. Although the existence of pressure and temperature waves in the exit gas is well documented, the present invention arises through the discovery that these characteristics can have an effect on the laser performance particularly with regard to the performance of the flexible tubing. Heretofore, failures in flexible tubing were believed attributable to chemical phenomena brought on by the particular laser medium interacting with the material of the flexible polymer tubing. Various attempts at improving the performance of flexible tubing by changes in composition did not achieve any noticeable improvement. Tubing performance could be improved by using much more sturdy and substantial tubing than that which would normally be thought adequate, but that would defeat the objective of using flexible tubing.

The present invention provides an improvement which comprises the inclusion of a device in cooperative association with the laser and flexible tubing which permits the use of narrow flexible tubing at an enhanced level of performance; it has the potential for expanding the operational capabilities of the laser, permitting the use of higher pulse frequencies if so desired; it also improves the useful life of narrow flexible tubing.

Briefly the invention comprises the inclusion of a walled chamber device through which the exit gas is conducted before the gas passes into a flexible line. The device is constructed and arranged to possess a particular attenuation characteristic, or characteristics. It can serve to attenuate the peak pressures which occur in the exit gas before they reach the flexible line; it can also possess a thermal attenuation characteristic which attenuates the temperatures before the gas enters the flexible lines. The preferred embodiment of the device disclosed herein comprises a cylindrical walled chamber forming an enclosed space with an inlet tube and outlet tube providing for connection of the device in an exit gas line just before the flexible line.

DESCRIPTION OF THE PREFERRED EMBODIMENT

Figure 1:
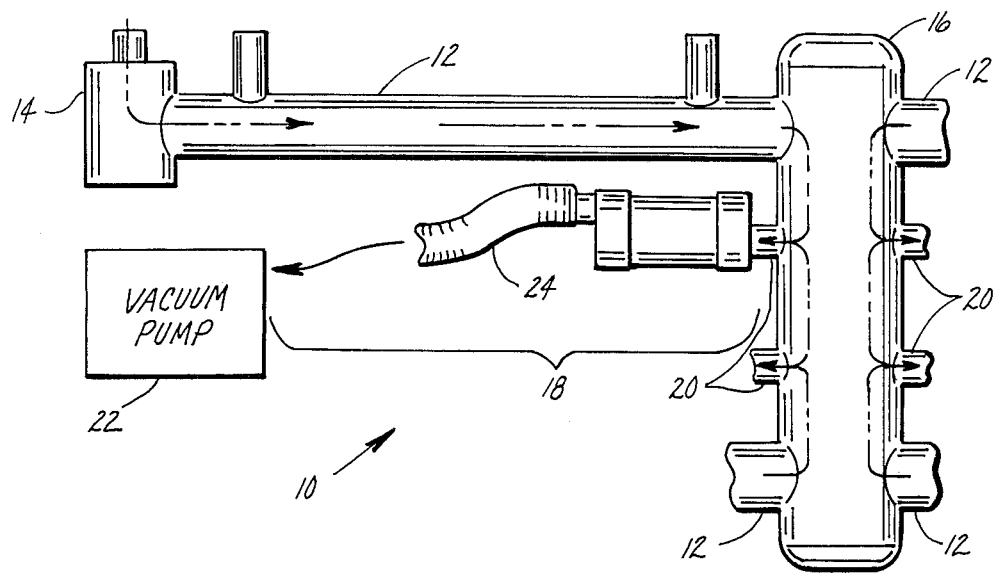
FIG. 1 is a view somewhat schematic in nature, of the relevant portions of a laser containing a device embodying principles of the present invention.

FIG. 1 illustrates relevant portions of laser 10 disclosing principles of a preferred embodiment of the present invention.

Laser 10 comprises a cavity 12 through which a suitable gas passes from a gas inlet 14 to an exhaust manifold 16. The gas is subjected to a pulsed frequency electric field within the cavity through suitable electrode structures (not shown) to excite the gas molecules. The exit gas is conducted through exhaust manifold 16 to an exhaust line designated by the general reference numeral 18.

Exhaust manifold 16 comprises an exhaust port 20 to which the exhaust line 18 attaches. Exhaust line 18 leads to a vacuum pump 22 which is operated to cause the gas to be pumped through the laser.

FIG. 1 illustrates a manifold 16 which serves multiple cavities although only one cavity and one exhaust line are shown. It will be appreciated that the other exhaust ports 20 connect to other similar exit lines 18 and that there are other cavities 12.

As mentioned earlier, many laser installations mandate the use of flexible tubing in the exit lines, and for example, such flexible lines are typically flexible polymer tubing. FIG. 1 shows the use of a flexible polymer tube 24, one end of which connects to vacuum pump 22. Before the present invention, the other end of tube 24 would be connected directly to exhaust port 20.

The present invention involves the inclusion of a device 26 in the exit line between tube 24 and exhaust port 20. Details of device 26 will be subsequently explained, but in order for the reader to better appreciate the present invention a brief discussion of the prior manner of connection of the flexible tubing to the laser is believed useful.

With tube 24 connected directly to manifold 16, the exit gas would pass from the manifold directly into the flexible line. In certain usages, it was observed that the flexible lines experienced an unexpected loss of performance often leading to early failure. At the time it was believed that the problem was the result of chemical phenomena, i.e. chemical attacking of the polymer tubing by the gas or some impurity. However, proposed solutions addressed to changing the chemistry involved did not seem to solve the problem.

The problem of course might be solved by mechanically strengthening lines 24, but this would increase the cost of the lines and/or to impair the desired degree of flexibility and/or increase the diameter beyond desired narrow diameter.

The present invention has been developed through recognition that the pressure and temperature waves created in the exit gas are the primary sources of this particular problem, and it solves the problem without requiring stiffer, less flexible lines. The invention comprises the inclusion of a device connected in the exit gas line before the flexible line. Although in retrospect the device itself may seem relatively uncomplicated, it provides a significant improvement in a pulsed gas laser. Not only does it address the problem of certain failures in flexible polymeric tubing, but it has been found to permit a laser to be pulsed at significantly higher frequencies than have heretofore been used. For example pulse rates as high as 10 kilohertz are fully contemplated.

The present invention involves the concept of attenuating the pressure and temperature waves which are created in the pulse discharge before those waves can reach the flexible exit gas line tubing, and this is accomplished in the illustrated embodiment by connecting a device 26 upstream of each flexible line.

Figure 3:
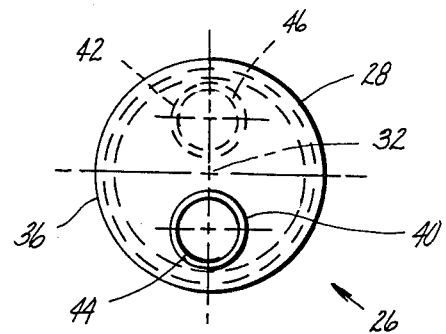
FIG. 3 is a right hand end view of FIG. 2.
Figure 2:
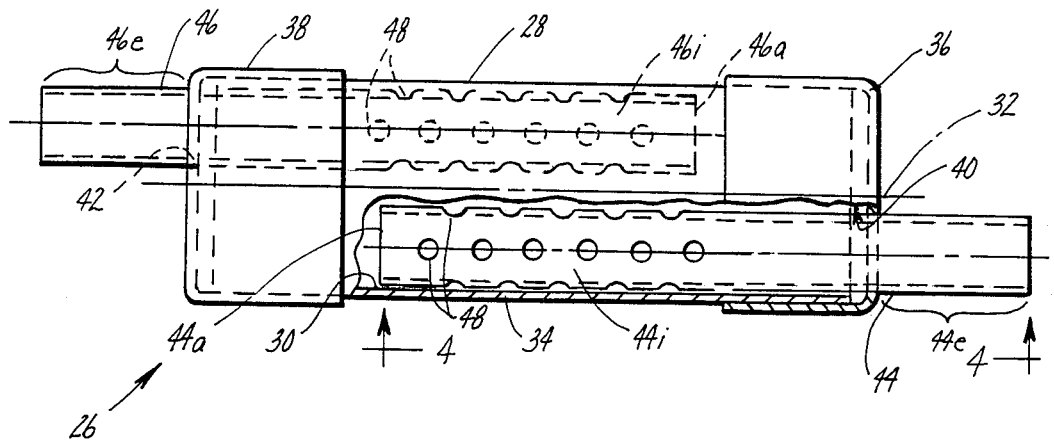
FIG. 2 is an enlarged view of the device of FIG. 1 with a portion broken away for purposes of illustration.
Figure 4:
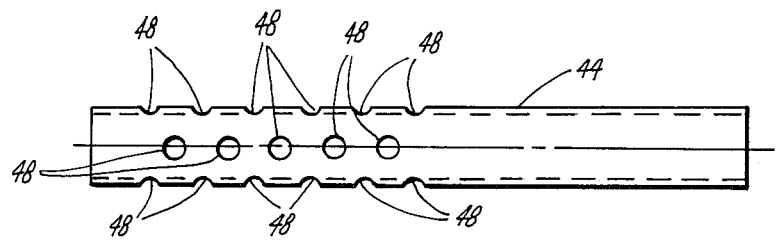
FIG. 4 is a view taken in the direction of arrows 4—4 in FIG. 2 and illustrating one component of the device itself.

Therefore turning to device 26 and details thereof as shown in drawing FIGS. 2–4, the reader will see that device 26 comprises a walled chamber 28 of circular cylindrical shape forming an enclosed chamber space 30. Device 26 has a central longitudinal axis 32 with chamber space 30 being enclosed by a tubular sidewall 34 and caps 36 and 38 fitted onto the ends of sidewall 34 to form endwalls.

Caps 36 and 38 comprise circular holes 40 and 42 respectively in the respective endwalls, and respective inlet and outlet tubes 44 and 46 pass through the respective openings 40 and 42.

Inlet tube 44 has an exterior section 44e which provides for attachment to an exhaust port 20 of manifold 16 in any suitable manner. Similarly outlet tube 46 has an exterior section 46e which provides for connection with the end of flexible line 24. The two tubes 44 and 46 have respective interior sections 44i and 46i disposed within the interior of the chamber space 30.

The two tubes 44 and 46 are essentially identical. They fit closely within the respective holes 40 and 42 and may be soldered, brazed or otherwise attached and sealed to the end caps 36, 38 around holes 40 and 42. The end caps 36 and 38 are themselves soldered, brazed or otherwise attached and sealed with respect to the ends of sidewall 34.

The end 44a, 46a of each tube 44, 46 which is disposed within the interior of the chamber space stops short of the endwall which is opposite that through which corresponding tube passes. The tubes are also provided with a series of apertures 48 which are arranged in a particular pattern. By way of example each tube is shown to have a series of apertures 48 arranged at uniform spacing distances along a portion of its length within chamber space 30. The apertures, which are small circular holes, may be considered to comprise individual pairs arranged diametrically opposite each other and with immediately adjacent pairs of holes being circumferentially offset 90° apart. As can be seen in FIG. 2 the tubes are inserted such that the end of the interior section of each tube and the first pair of apertures 48 in the opposite tube lie in a common plane which is substantially at a right angle to the central longitudinal axis 32. The remaining pairs of holes have similar relationships with respect to corresponding pairs in the opposite tube.

Figure 5:
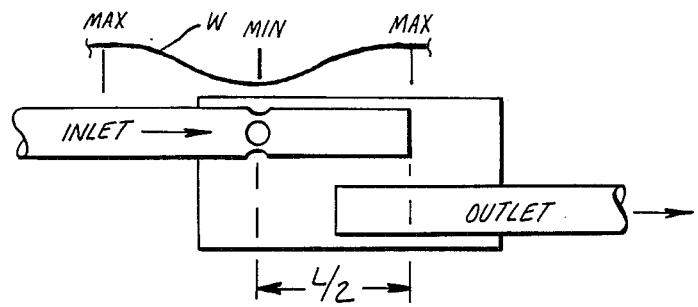
FIG. 5 is a view useful in explaining a principle of operation.

The purpose of arranging the two tubes in this particular way is to provide a range of frequencies over which the pressure wave peaks are attenuated through use of conventional wave theory principles. For example FIG. 5 illustrates application of wave theory for one particular case. As a wave W propagates along the inlet tube it has a maximum MAX. and a minimum MIN. which are spaced apart one-half wavelength L/2. By arranging the construction such that there are openings which are one-half wavelength apart, the maxima and minima substantially cancel at the outlet tube whereby the pressure wave peaks are significantly attenuated as the flow exits through the outlet tube. Hence the illustrated construction of device 26 is such as to provide for attenuations over a range of frequencies, and as noted above, these frequencies can extend into higher ranges than have heretofore conventionally been used.

Device 26 also is endowed with a thermal conductivity characteristic which provides for thermal dissipation. In this way temperature peaks are also attenuated before they can reach the flexible polymer line. Copper is a material of good thermal conductivity, and it is well suited for this particular application since it also possesses suitable strength and it can be fabricated with known procedures. As the gas enters chamber space 30, it is forced to flow within the chamber space before entering the outlet tube. Accordingly, heat is transferred from the gas to the walled chamber 28 and in turn to the adjacent exterior space, and hence peak temperatures in the exit gas are attenuated before they can reach the flexible polymer tubing.

On the basis of the foregoing description, the reader can appreciate that an improvement in a pulsed gas laser has been provided. By way of example only, in one illustrative embodiment of device 26 the inlet and outlet tubes comprise a half-inch O.D. copper tube containing apertures 28 of one-eighth inch diameter and with immediately adjacent pairs of apertures 28 approximately three-sixteenths inch distance apart. The length of the walled chamber 28 is four and a half inches and it has a diameter of one and a half inches. The overall length of the device with tubes inserted into the walled chamber is six and one half inches.

While a preferred embodiment of the invention has been disclosed, it will be appreciated that principles are applicable to other embodiments.

What is claimed is:

1. In a gas laser having a cavity through which an active gas is passed and subjected to a pulsed frequency electric field for exciting the gas molecules and wherein exit gas is pumped from the cavity through an exit path which includes a flexible tube, the improvement for enhancing performance of the flexible tube comprises a device through which the exit gas passes before entering the flexible tube, said device comprising a walled chamber providing substantial attenuation of pressure waves in the exit gas at the pulse frequency before the exit gas reaches the flexible tube.

2. The improvement set forth in claim 1 in which said walled chamber is constructed of a material having good thermal conductivity, such as copper.

3. The improvement set forth in claim 1 in which the laser comprises an exhaust gas manifold, said device has an inlet which connects to said exhaust gas manifold, and said device has an outlet which connects to the flexible tube.

4. The improvement set forth in claim 3 in which the laser comprises multiple exhaust gas outlet ports in the exhaust gas manifold, and including a plurality of said devices each of which has its inlet connected to a corresponding exhaust gas outlet port of the exhaust gas manifold, and a plurality of flexible tubes each of which is connected to the outlet of a corresponding one of said devices.

5. The improvement set forth in claim 1 in which said walled chamber is of circular cylindrical shape having circular end walls at opposite axial ends and in which said device includes an inlet tube and an outlet tube respectively disposed at respective ones of said end walls.

6. The improvement set forth in claim 5 in which said walled chamber has a central longitudinal axis and said inlet and outlet tubes have respective axes which are generally parallel to but radially offset from the central longitudinal axis of the walled chamber.

7. The improvement set forth in claim 6 in which said inlet and outlet tubes are disposed diametrically opposite each other an equal distance from the central longitudinal axis of the walled chamber, and said tubes have interior sections disposed within the walled chamber and exterior sections on the exterior providing for connection of the device in the exit path.

8. The improvement set forth in claim 7 in which there are provided one or more apertures extending through the sidewall of the interior section of at least one of said inlet and outlet tubes to provide the device with a particular frequency attentuation characteristic.

9. The improvement set forth in claim 8 in which there are a plurality of such apertures providing attenuation of multiple frequencies.

10. The improvement set forth in claim 9 in which said apertures are arranged at regular lengthwise intervals.

11. The improvement set forth in claim 8 in which said apertures are arranged in at least one set of two apertures.

12. In a gas laser having a cavity through which a gas is passed and subjected to a pulsed frequency electric field for exciting the gas molecules and generating pressure and temperature waves in the exit gas which is pumped from the cavity through an exit path which includes a flexible tube, the improvement for enhancing performance of the flexible tube which comprises a device through which the exit gas passes before entering the flexible tube, said device comprising means providing attenuation of pressure waves in the exit gas at the pulsed frequency before the exit gas reaches the flexible tube and attenuation of the temperature waves before they reach the flexible tube.

13. The improvement set forth in claim 12 in which said device comprises a walled chamber constructed of a material having a good thermal conductivity such as copper to provide temperature attenuation.

* * * * *